J. B. HAMPTON.
Horse Collar.
No. 233,929.  Patented Nov. 2, 1880.
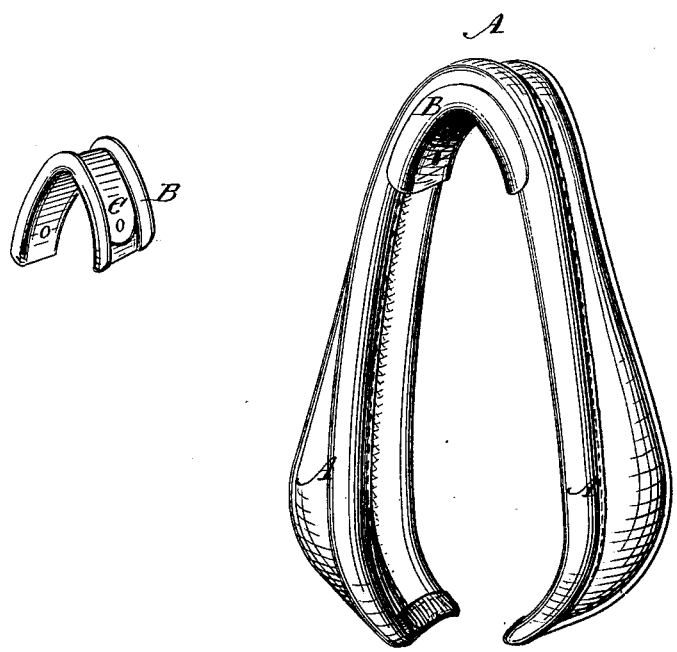
WITNESSES:
C. Neveux
C. Sedgwick
INVENTOR:
J. B. Hampton
BY Munn & Co.
ATTORNEYS.

UNITED STATES PATENT OFFICE.

JOHN B. HAMPTON, OF POMEROY, OHIO.

HORSE-COLLAR.

SPECIFICATION forming part of Letters Patent No. 233,929, dated November 2, 1880.

Application filed February 25, 1880.

*To all whom it may concern:*

Be it known that I, JOHN B. HAMPTON, of Pomeroy, in the county of Meigs and State of Ohio, have invented a new and useful Improvement in Horse-Collars, of which the following is a specification.

Figure 1 is a perspective view of the improvement. Fig. 2 is a perspective view of the pad and spring.

Similar letters of reference indicate corresponding parts.

The object of this invention is to furnish horse-collars so constructed that they can be conveniently put on and taken off, that will not injure the horse's neck, will not press upon his windpipe, and will be strong and durable.

The invention consists in constructing an open-bottomed horse-collar with a spring interposed between the pad and the closed top, as will be hereinafter fully described.

A represents the collar, which is closed at the top and open at the bottom, as shown in the drawings. In the top of the collar A, between the closed top and the pad B, is placed a steel spring, C, to keep the collar in place and shape. With this construction the collar will have a smooth bearing-surface for the horse's neck, so that the hame-straps cannot hurt his neck.

The open bottom of the collar A prevents any pressure from coming on the horse's windpipe, so that his wind cannot be injured, as it is liable to be when the horse has to work with a pressure upon his windpipe. With this construction the collar can be conveniently put on and taken off, and will be held in place by the hames.

The collar should be so made that there will be about three inches space between the ends of the collar; but a slight variation from this size will make no difference, so that the same collar may be worn upon horses with larger or smaller necks without injury.

The spring C keeps the collar in place and shape, so that it will not be liable to break at the top.

Having thus described my invention, I claim as new and desire to secure by Letters Patent—

In combination with a horse-collar closed at the top and open at the bottom, the pad B, having a spring attachment to its outer upper surface, all operating substantially as set forth, for the purpose stated.

JOHN BRUNER HAMPTON.

Witnesses:
F. F. FLETCHER,
L. H. LEE.